United States Patent [19]

Saito et al.

[11] Patent Number: 5,560,886

[45] Date of Patent: Oct. 1, 1996

[54] PROCESS FOR PRODUCING A MODIFIED POLYPROPYLENE AND A MOLDED PRODUCT

[75] Inventors: Jun Saito, Kimitsushi; Shingo Kikukawa, Ichiharashi; Keizo Makuuchi; Fumio Yoshii, both of Takasakishi, all of Japan

[73] Assignees: Chisso Corporation, Osaka; Japan Atomic Energy Research Institute, Tokyo, both of Japan

[21] Appl. No.: 425,554

[22] Filed: Apr. 20, 1995

[30] Foreign Application Priority Data

Apr. 20, 1994 [JP] Japan .................... 6-106128

[51] Int. Cl.$^6$ .................... B29C 35/08
[52] U.S. Cl. .................... 264/485; 264/470; 264/488; 264/85; 522/129; 526/351
[58] Field of Search .................... 264/485, 488, 264/495, 85, 470, 564, 463, 461; 522/129; 526/351

[56] References Cited

U.S. PATENT DOCUMENTS

| 3,349,018 | 10/1967 | Potts . | |
|---|---|---|---|
| 3,563,870 | 2/1971 | Tung et al. | 264/470 |
| 4,049,757 | 9/1977 | Kammel et al. | 264/485 |
| 4,065,594 | 12/1977 | Shii et al. | 264/463 |
| 4,134,812 | 1/1979 | Sasaki et al. | 264/485 |
| 4,226,905 | 10/1980 | Harbourne | 264/564 |
| 4,282,076 | 8/1981 | Boynton | 264/470 |
| 4,367,185 | 1/1983 | Nojiri et al. | 264/485 |
| 4,442,233 | 4/1984 | Lohmar et al. | 264/485 |
| 4,916,198 | 4/1990 | Scheve et al. | 526/351 |
| 5,047,485 | 9/1991 | Denicola, Jr. | 525/387 |
| 5,078,925 | 1/1992 | Rolando et al. | 264/470 |

FOREIGN PATENT DOCUMENTS 62-121704  6/1987  Japan .

*Primary Examiner*—Jeffery R. Thurlow
*Attorney, Agent, or Firm*—Lowe, Price, LeBlanc & Becker

[57] ABSTRACT

A process for producing a modified polypropylene having a very high melt tension and superior stiffness and moldability, and a molded product obtained by using the modified polypropylene are provided.

which process includes adding 0.05 to 10 millimols of a cross-linking auxiliary to 100 g of a linear polypropylene, mixing them, irradiating ionizing radiations to the mixture so as to give an absorbed dosage of 1 to 20 kGy, and successively heat-treating the resulting material at 80° to 350° C., which modified polypropylene has (A) a degree of branching of substantially 1, (B) a relationship between its melt tension (MS) at 230° C. and its intrinsic viscosity ($\eta$) measured in tetralin at 230° C. expressed by an inequality $$\log (MS) > 4.24 \times \log [\eta] - 0.915, \text{ and}$$

(C) a percentage of extraction residue in boiling xylene of 1% by weight or less.

4 Claims, No Drawings

PROCESS FOR PRODUCING A MODIFIED POLYPROPYLENE AND A MOLDED PRODUCT

BACKGROUND OF THE INVENTION

1. Field of the Invention

This invention relates to a process for producing a modified polypropylene having a high melt tension.

More particularly, it relates to a process for producing a modified polypropylene having a high melt tension, a superior stiffness and moldability and yet, capable of being used for recycle by remelting after used as a molded product.

2. Description of the Related Art

Crystalline polypropylene is superior in the mechanical properties, resistance to chemicals, etc. and very useful in the aspect of the balance between these properties and the economy; hence it has been broadly used in various molding fields. However, since it has a low melt tension and a low crystalline temperature, it has been inferior in the moldability such as hollow molding, foam molding, extrusion molding, etc.

As a process for raising the melt tension and the crystallization temperature of crystalline polypropylene, there has been disclosed a process of mixing an organic peroxide and a crosslinking auxiliary with crystalline polypropylene, followed by melt-kneading the resulting mixture by means of an extruder (Japanese patent application laid-open Nos. Sho 59-93711 and Sho 61-152754). However, the improvement of the melt tension has been insufficient.

Further, there has so far been known a process of adding a crosslinking auxiliary to polypropylene, followed by irradiating ionizing radiations to obtain a crosslinked polypropylene (Japanese patent publication No. Sho 35-13138 and Japanese patent application laid-open Nos. Sho 49-110736 and Sho 54-25972). Since the object of these techniques has been directed to formation of a tight, three-dimensional bond to thereby improve the heat resistance, a large quantity of gels were formed; hence molding processing after the crosslinking was impossible.

On the other hand, Japanese patent application Laid-Open No. Sho 62-121704 discloses a process of irradiating electron rays onto a semi-crystalline polypropylene in the absence of oxygen to obtain a polypropylene having a free end, long chain branch and containing no gel, but irradiation of a large quantity of electron rays has been required.

Problem to be Solved by the Invention

As described above, polypropylenes obtained according to known processes have raised problems that improvement in the melt adhesion thereof has been insufficient, and besides, due to gels contained therein, it has been impossible for molded products therefrom to remelt them after used and reuse them for recycle.

In order to solve the problems raised in the prior inventions and invent a polypropylene suitable to moldings such as blow molding, foam molding, extrusion molding, etc. and further a process for producing the same, the present inventors have made extensive researches. As a result, the present inventors have found a modified polypropylene having a specified structure and properties according to a process of irradiating a low dosage of ionizing radiations upon a mixture of a polypropylene with a specified quantity of a cross-linking auxiliary, and when the modified polypropylene is used for molded products, the problem of known inventions can be solved.

As apparent from the above description, the object of the present invention is to provide a process for producing a modified polypropylene having a high melt tension and a superior stiffness and moldability, and yet after used as molded products, being capable of remelting and using the molded products for recycle; and also to provide a molded product obtained by using the modified polypropylene obtained according to the above process.

SUMMARY OF THE INVENTION

The present invention has the following constitutions (1) to (5):

(1) A process for producing a modified polypropylene having
  (A) a degree of branching of substantially 1,
  (B) a relationship between its melt tension (MS) at 230° C. and its intrinsic viscosity ($\eta$) measured in tetralin at 135° C. expressed by an inequality $\log (MS) > 4.24 \times \log [\eta] - 0.915$, and (C) a percentage of extraction residue in boiling xylene of 1% by weight or less,
which process comprises adding 0.05 to 10 millimols of a cross-linking auxiliary to 100 g of a linear polypropylene, mixing them, irradiating ionizing radiations to the mixture so as to give an absorbed dosage of 1 to 20 kGy, and successively heat-treating the resulting material at 80° to 350° C.

(2) A process according to item (1), wherein one member or more of compounds chosen from among divinylaromatic compounds, diacrylates and dimethacrylates are used as said cross-linking agent.

(3) A process according to item (1), wherein electron rays are used as the ionizing radiations.

(4) A process according to item (1), wherein the irradiation of the ionizing radiations and the heat-treatment are carried out in an atmosphere of an inert gas.

(5) A molded product obtained by adding 0.05 to 10 millimols of a cross-linking auxiliary to 100 g of a linear polypropylene, mixing them, irradiating ionizing radiations to the mixture so as to give an absorbed dosage of 1 to 20 kGy, and successively heat-treating the resulting material at 80° to 350° C., which molded product has
  (A) a degree of branching of substantially 1,
  (B) a relationship between its melt tension (MS) at 230° C. and its intrinsic viscosity ($\eta$) measured in tetralin at 135° C. expressed by the following inequality:

$\log (MS) > 4.24 \log [\eta] - 0.915$, and (C) a percentage of extraction residue in boiling xylene of 1% by weight or less.

DETAILED DESCRIPTION OF THE INVENTION

The constitution and effectiveness of the present invention will be described below in more detail.

In addition, the term "polypropylene" used in the present invention includes not only propylene homopolymer but also a propylene-olefin random copolymer and a propylene-olefin block copolymer, each containing 30% by weight or less of an olefin other than propylene in the copolymers.

The modified polypropylene obtained according to the process of the present invention is a linear polypropylene having (A) a degree of branching of substantially 1.

The degree of branching refers to an extent of long chain branching and it is generally defined by the following equation:

Degree of branching $(g) = [\eta]Br/[\eta]Lin$ wherein $[\eta]Br$ refers to the intrinsic viscosity of branched polypropylene, and also refers to the measured value $[\eta]_{obs}$ of the modified polypropylene obtained according to the process of the present invention. Further, the $[\eta]Lin$ refers herein to the intrinsic viscosity of a linear polypropylene having the same weight average molecular weight as that used as a raw material in the production process of the modified polypropylene of the present invention mentioned below and obtained according to known process, and having the same weight average molecular weight as that of the sample of the above $[\eta]_{obs}$.

When the above ratio of the intrinsic viscosities refers to a degree of branching of non-linear polymer and a long chain branch is present, then the ratio is less than 1.

In addition, the intrinsic viscosities were measured using a sample dissolved in tetralin and at 135° C.

Further, the weight average molecular weight (Mw) was measured according to a method reported by M. L. McConnell in American Laboratory, May, 63–75 (1978), i.e. a measurement method of light-scattering intensity by way of a low angle laser light-scattering.

The modified polypropylene obtained according to the process of the present invention has a degree of branching of substantially 1 according to the above definition and measurement method, and has no long chain branched structure.

The above term "substantially 1" means that the long chain branch is below its detection limit, if any, and it means "1" including a statical error range in the case where the same sample has been repeatedly measured according to the above method. Thus, its practical value refers to about 0.95 to 1.05.

In view of the fact that the degree of branching is substantially 1, the modified polypropylene obtained according to the process of the present invention has the same properties as those of so far known linear polypropylenes, except for the characteristic properties of the above modified polypropylene; hence the above modified polypropylene is characterized in that the molding method and apparatus used for so far known linear polypropylenes can be employed as they are, for the above modified polypropylene.

Further, the polypropylene of the present invention should satisfy the following two indispensable requirements:

(B) The melt tension (MS) at 230° C. and the intrinsic viscosity $[\eta]$ measured in tetralin at 135° C. has a relationship of $\log (MS) > 4.24 \log [\eta] - 0.915$, and further, (C) the percentage of extraction residue in boiling xylene is 1% by weight or less.

The melt tension of the modified polypropylene required for achieving the object of the present invention has a relationship between the melt tension (MS) at 230° C. and the intrinsic viscosity $[\eta]$ measured in tetralin at 135° C., of $\log (MS) > 4.24 \log [\eta] - 0.915$, as described, preferably $\log (MS) > 4.24 \log [\eta] - 0.74$, and more preferably $\log (MS) > 4.24 \log [\eta] - 0.615$.

In addition, when the present inventors have observed the relationship between the melt tension (MS) and the intrinsic viscosity $[\eta]$ of usually known linear polypropylene used by the present inventors as the raw material, a relationship expressed by $\log (MS) = 4.24 \log [\eta] - 1.217$ has been found.

The melt tension (MS) at 230° C. refers to that obtained by heating a polypropylene at 230° C. in the apparatus of melt tension tester 2-type manufactured by Toyoseiki Seisakusho, followed by extruding the resulting melted polypropylene through a nozzle of 2.095 mm in diameter into air at 23° C. at a speed of 20 mm/min. to obtain a strand, taking off the strand at a speed of 3.14 m/min. and measuring the tension of the filamentary polypropylene at the time of the take-off.

The modified polypropylene obtained according to the process of the present invention is required to have a percentage of extraction residue in boiling xylene as a measure of gel content, of 1% by weight or less, as described, preferably 0.7% by weight or less, more preferably 0.5% by weight or less. If the percentage of extraction residue is higher than the above value, when a molded product is prepared by using the resulting modified polypropylene, the moldability is inferior and besides, it is very difficult to remelt the molded product after used and reuse it for recycle.

The percentage of extraction residue in boiling xylene was obtained by placing polypropylene (1 g) in a metal gauze of 200 mesh, followed by subjecting it to extraction in boiling p-xylene (200 ml) for 6 hours, by means of Soxhlet extractor, dry-weighing the resulting extraction residue and calculating it in terms of (weight of extraction residue/weight before extraction) ×100%.

Next, the process for producing the modified polypropylene of the present invention having the above-mentioned requirements of characteristics will be described below.

The linear polypropylene used in the above process refers to a known linear polypropylene obtained by polymerizing propylene using a catalyst having combined ① a transition metal compound catalyst component and ① an organometal compound catalyst component containing a metal chosen from among those of the first group to the third group, and if necessary, ① an electron donor.

Specifically the polypropylene includes not only propylene homopolymer, but also random copolymers of propylene with an olefin other than propylene, such as linear monoolefins e.g. ethylene, butene-1, pentene-1, hexene-1, heptene-1, octene-1, etc., branched monoolefins e.g. 4-methylpentene-1, 2-methylpentene-1, etc., the so-called block copolymers obtained by propylene homopolymerization or copolymerization of propylene with a small quantity of an olefin other than propylene affording a content of the olefin other than propylene of 3% by weight or less, followed by random copolymerization of propylene with an olefin other than propylene.

When copolymers are used, olefins other than propylene are not limited to one kind, but two kinds or more may be contained. Specific examples thereof are propylene-ethylene copolymer, propylene-butene-1 copolymer, propylene-hexene-1 copolymer, propylene-octene-1 copolymer, propylene-4-methylpentene-1 copolymer, propylene-ethylene-butene-1 copolymer, propylene-ethylene-4-methylpentene-1 copolymer, etc. At that time, the content of olefins other than propylene has no particular limitation, but it is preferred to be 30% by weight or less. If the content exceeds 30% by weight, gels are liable to be formed in the resulting polypropylene; hence such excess content is outside the range of the present invention.

As the catalyst component (1) of the transition metal compound used when the above linear polypropylene is produced, compounds containing transition metals chosen from among metals of III group to VIII group of the Periodic Table can be mentioned, and concretely, compounds containing one kind or more of metals chosen from among Ti, Zr, Hf, Nb, Ta, Cr and V are mentioned.

As such catalyst component ① of the transition metal compound, known catalyst components for olefin polymerization are mentioned. Concretely, a supported type catalyst component consisting of Ti, Mg, halogen and if necessary, an electron donor, obtained by contacting Ti compound, Mg compound and if necessary, an electron donor containing either one or more of O, N, P and S in the molecule, and a titanium trichloride catalyst component obtained by contacting a titanium trichloride composition obtained by reducing $TiCl_4$ and tetravalent Ti compound and/or an electron donor, are mentioned.

Further, a metallocene compound obtained by contacting a cyclopentadienyl compound with a transition metal compound is also usable.

Further, a substance having the metallocene compound further supported on an inorganic compound such as $SiO_2$, $Al_2O_3$, etc. or a high molecular compound such as polyethylene, polypropylene, etc. is also usable.

Further, as ② the organometallic compound catalyst component containing a metal chosen from among those of the first group to the third group of the Periodic Table, concretely, organoaluminum compounds such as trialkylaluminum, dialkylaluminum halide, alkylaluminum sesquihalide, aluminoxane, etc. are preferably used.

Further, as ③ an electron donor used if necessary, compounds containing either one or more kinds of O, N, P and S in the molecule are mentioned, and concretely, organosilicon compounds containing Si-O bond, esters, ethers, etc. are preferably used.

Propylene is polymerized according to known polymerization processes, such as a slurry polymerization of polymerizing propylene in an inert solvent, using a catalyst obtained by combining ① a transition metal compound catalyst component and ② an organometallic compound catalyst component containing a metal chosen from those of the first group to the third group of the Periodic Table, and if necessary, ③ an electron donor; a bulk polymerization using propylene itself as solvent; a gas phase polymerization directed to gas composed mainly of propylene; or a combination of these polymerization processes. The thus obtained linear polypropylene is used for the present invention.

Further, as to the shape of the linear polypropylene, since it is necessary to blend the polypropylene with a cross-linking auxiliary, powder obtained according to the above processes, but in the state just after completion of the polymerization process and prior to pelletization, is a preferable shape.

As to the cross-linking auxiliary used in the present invention, so long as it exhibits an effect satisfying the requirements of properties necessary for the modified polypropylene obtained according to the process of the present invention mentioned later, known cross-linking auxiliaries used for cross-linking polyolefins are usable.

Such cross-linking auxiliaries are compounds containing two or more double bonds in the molecule.

Examples of specific cross-linking auxiliaries are as follows:
monoacrylates such as t-butyl acrylate, lauryl acrylate, cetel acrylate, stearyl acrylate, 2-methoxyethyl acrylate, ethylcarbitol acrylate, methoxytripropylene glycol acrylate, etc. monomethacrylates such as t-butyl methacrylate, lauryl methacrylate, cetyl methacrylate, stearyl methacrylate, methoxyethylene glycol methacrylate, methoxypolyethylene glycol methacrylate, etc., diacrylates such as 1,4-butanediol diacrylate, 1,6-hexanediol diacrylate, 1,9-nonanediol diacrylate, neopentyl glycol diacrylate, diethylene glycol diacrylate, tetraethylene glycol diacrylate, polyethylene glycol diacrylate, tripropylene glycol diacrylate, polypropylene glycol diacrylate, etc., dimethacrylates such as 1,3-butanediol dimethacrylate, 1,6-hexanediol dimethacrylate, 1,9-nonanediol dimethacrylate, neopentyl glycol dimethacrylate, ethylene glycol dimethacrylate, diethylene glycol, dimethacrylate, triethylene glycol dimethacrylate, polyethylene glycol dimethacrylate, etc., triacrylates such as trimethylolpropane triactylate, trimethylolethane triacrylate, etc. trimethacrylates such as trimethylolpropane trimethcrylate, trimethylolethane trimethacrylate, etc., tetraacrylates such as pentaerythritol tetraacrylate, tetramethylolmethane tetraacrylate, etc., divinylaromatic compounds such as divinylbenzene, di-i-propenylbenzene, etc., cyanurates such as triallyl cyanurate, triallyl isocyanulate, etc., diallyl compounds such as diallyl phthalate, etc., oximes such as p-quinone dioxime, p,p'-dibenzoylquinone dioxime, etc., maleimides such as phenylmaleimide, etc.

Among these cross-linking auxiliaries, diacrylates, dimethacrylates and divinyl aromatic compounds are preferable and diacrylates are more preferable.

In the process of the present invention, a cross-linking auxiliary is added to and mixed with the above-mentioned linear polypropylene. The proportion of the addition and mixing is 0.05 to 10 mmols of the cross-linking auxiliary based on 100 g of linear polypropylene, preferably 0.1 to 7 mmols, more preferably 0.1 to 4 mmols based thereon.

If the addition proportion of the cross-linking auxiliary is less, the improvement in the melt tension of the resulting modified polypropylene is insufficient, and if the proportion is more, the resulting modified polypropylene contains gels; hence either of the proportions are outside the range of the present invention.

When a cross-linking auxiliary is added to and mixed with a linear polypropylene, it is also possible to dilute the cross-linking auxiliary with an inert solvent represented by a hydrocarbon solvent such as toluene, xylene, isoparaffin, octane, decane, etc., in the aspect of handling, and in order to effect uniform mixing.

The addition and mixing of the cross-linking auxiliary with the linear polypropylene can be carried out according to usually known method, for example using an agitating mixer such as Henschel mixer (tradename), super mixer, etc.

In the present invention, subsequent to the mixing, ionizing radiations are irradiated to the mixture of the linear polypropylene with the cross-linking auxiliary, but it is also possible to melt-knead the mixture in advance of the irradiation, followed by cutting the resulting material into granular form to obtain pellets, and irradiating the pellets with ionizing radiations.

In the present invention, ionizing radiations are irradiated to the mixture of the linear polypropylene with the cross-linking auxiliary obtained according to the above process.

As the ionizing radiations herein used in the present invention, α-rays, β-rays, γ-rays, X-rays and electron rays are mentioned, but γ-rays and electron rays are preferred, and electron rays are practically preferred. The dose of radiations of the ionizing radiations is not particularly defined, but in the case of γ-rays, an irradiation condition of using a dose of radiations of about $2.6 \times 10^{-2}$C. to $2.6 \times 10^2$C.$Kg^{-1}$/h is possible, and in the case of electron rays, an irradiation condition of using 500 times or more the amount of radiations in the case of γ-rays is possible. The case of electron rays where irradiation in a large amount of radiations is possible, is economically preferable since a large quantity of the modified polypropylene can be obtained in a short time.

As to the irradiation of the ionizing radiations to the mixture of the linear polypropylene with the cross-linking auxiliary, a range of the amount of radiations in a range of 0.1 to 20 kGy is suitable, and a range of 0.2 to 15 kGy is preferable, and that of 0.5 to 10 kGy is more preferable.

If the amount of absorbed radiations is small, the improvement in the melt tension of the modified polypropylene is insufficient, while if the amount is large, gels occur in the resulting modified polypropylene. Thus, either of the cases are outside the range of the present invention.

The (Gy) referred to herein is usually defined as an amount of ionizing radiations in which the ionizing radiations yield an absorption of an energy of 1 J per 1 Kg of a substance to be irradiated, independently of the source of the radiations. In the present invention, the amount of absorbed radiations of the mixture of the linear polypropylene with the cross-linking auxiliary is not directly measured, but the amount means that it is equivalent to the amount of radiations absorbed by a known, usual dose rate meter placed on the surface of the mixture to be irradiated and indicated by the measurement.

The temperature at which the ionizing radiations are irradiated to the mixture of the linear polypropylene with the cross-linking auxiliary is in the range of $-10°$ to $80°$ C., preferably $-5°$ to $6°$ C., more preferably $0°$ to $5°$ C.

The irradiation may be carried out in air as its atmosphere, but preferably in an inert gas atmosphere such as nitrogen atmosphere, in the aspects of the controllability of the intrinsic viscosity of the resulting modified polypropylene and the improvement in its melt tension.

In the process of the present invention, the irradiated mixture after irradiation with ionizing radiations is successively heat-treated at $80°$ to $300°$ C. The heat treatment is carried out in order to extinguish the radicals remaining in the irradiated mixture, and one embodiment of the heat treatment is carried out by heat-melt-kneading the mixture at $190°$ to $350°$ C., preferably $190°$ to $300°$ C., more preferably $200°$ to $280°$ C. by means of a melt-kneader. The melt-kneading period varies according to the kind of melt-kneader and hence it is not specified, but usually about 20 seconds to 30 minutes are sufficient. Usually, subsequent to the melt-kneading, the resulting material is cut into granules and pelletized.

In addition, as the melt-kneader, known, usual melt-kneader is used, such as uniaxial extruder, biaxial extruder, extruders having these extruders combined with gear pump, Brabender mixer, Banbury mixer, etc. Further, when the melt-kneading is carried out, it is possible, if necessary, to blend various additives such as antioxidant, ultraviolet absorber, antistatic agent, nucleating agent, lubricant, fire retardant, antiblocking agent, coloring agent, inorganic or organic filler, etc.

As another embodiment of the heat-treatment, the treatment is carried out at $80°$ to $150°$ C., preferably $90°$ to $150°$ C., more preferably $100°$ to $150°$ C. The embodiment is preferable when the resulting modified polypropylene is used in powder state for producing molded products. Further, an embodiment of heat-treatment at $80°$ to $150°$ C., followed by further melt-kneading at $190°$ to $350°$ C., is preferred.

The above heat-treatment may be carried out in air, but it is preferably carried out in an inert gas atmosphere such as nitrogen gas atmosphere, in the aspects of the improvements in the controllability of the intrinsic viscosity of the modified polypropylene and its melt tension.

Unless the heat-treatment is carried out, the resulting modified polypropylene becomes an unstable polypropylene having a large deterioration with time.

The modified polypropylene according to the production process of the present invention is obtained according to the above process, but in order to achieve the object of the present invention, the polypropylene should be furnished with the above three requirements of characteristics.

The thus obtained polypropylene of the present invention has a very high melt tension, a superior stiffness and moldability and yet after used as molded product, it is remelted and usable in recycle. Thus, it is suitable particularly to blow molding, foam molding or extrusion molding, but the molding is not limited to the above molding fields, and according to injection molding, T-die molding, heat forming, etc., the polypropylene can be molded into various vessels such as hollow vessel, and into various molded products such as film, sheet, pipe, fiber, etc.

EXAMPLE

The present invention will be described in more detail by way of Examples. The definitions of terms employed in Examples and Comparative examples and the measurement methods therein are as follows:

(1) Intrinsic viscosity: [η] was measured according to the above method (unit: dl/g).

(2) Weight average molecular weight: (Mw) was measured according to the above method.

(3) Degree of branching: (g) was measured according to the above method.

(4) Melt tension: (MS) was measured according to the above method (unit: gf).

(5) Stiffness: Polypropylene pellets were molded by means of an injection molding machine, at a melt resin temperature of $230°$ C. and at a mold temperature of $50°$ C., to prepare a test piece, followed by allowing the test piece to stand in a humidity of 50%, at a room temperature $23°$ C., for 72 hours, in a chamber, and measuring its bending modulus according to JIS K7230 (unit: $Kgf/cm^2$).

EXAMPLE 1

Using a reactor provided with a stirrer having slant blades, and purged with nitrogen gas, propylene was subjected to slurry polymerization using a catalyst consisting of a titanium trichloride composition obtained according to a process described in Example 1 of Japanese patent publication No. Sho 59-28573, diethylaluminum chloride (3 mols per one tool of Ti in the above composition) and diethylene glycol dimethyl ether as a third component (0.01 tool per one tool of Ti therein), in n-hexane and in the presence of hydrogen as a molecular weight-controlling agent.

To the resulting polypropylene powder (20 Kg) having an intrinsic viscosity [η] of 2.20 dl/g and an average particle diameter of 150 μm, was added 1,6-hexanediol diacrylate (0.1 mol) as a cross-linking auxiliary, followed by mixing them by means of Henschel mixer for 3 minutes.

The resulting mixture was placed in bags of polyethylene terephthalate provided with a cock in a quantity of 1 Kg in each of the bags, followed by 10 times repeating a procedure of bringing the inside of the bags into vacuum and feeding nitrogen gas up to an atmospheric pressure, fixing the bags containing the mixture of the polypropylene with the crosslinking auxiliary onto a conveyer for irradiating electron rays so as to give a thickness of the mixture of 1 cm.

The irradiation of electron radiations was carried out using Cockcroft-Walton electron accelerator, and passing the bags of polyethylene terephthalate containing the mixture of the polypropylene with the cross-linking auxiliary through the conveyer, 20 cm below an irradiation window, so as to give an absorbed dosage of 3.0 kGy of the mixture (conveyer velocity: 3.23 m/min. ), under conditions of an accelerated voltage of 2 MW and an electric current of 1.0 mA. The temperature at the time of the irradiation was 25° C.

Successively, the mixture after irradiation of electron radiations, as it was, was brought into an oven, and heat-treated in the oven at 135° C. for 30 minutes.

After completion of the heat-treatment, the resulting modified polypropylene was taken out from the bag of polyethylene terephthalate, in the form of powder.

Further, tetrakis [methylene-3-(3',5'-di-t-butyl-4'-hydroxyphenyl) propionate]methane (0.1 part by weight) and calcium stearate (0.1 part by weight) were mixed with the modified polypropylene (100 parts by weight), followed by melt-kneading and granulating the mixture at 230° C. by means of an extrusion-granulator having a screw diameter of 40 mm, to obtain the modified polypropylene in the form of pellets.

Examples 2 and 3 and Comparative example 1

Pellets of a modified polypropylene was obtained in the same manner as in Example 1, except that the intrinsic viscosity of polypropylene used for the reaction, the quantity of the cross-linking auxiliary added, the absorbed dosage of electron rays and the heat-treatment conditions prior to the melt-kneading were varied as indicated in Table 1.

Comparative Example 2

Pellets were obtained by irradiation of electron rays and heat-treatment in the same manner as in Example 1, except that polypropylene was used alone in place of the mixture of the polypropylene with the cross-linking auxiliary, without using the cross-linking auxiliary.

Comparative Example 3

Example 1 was repeated except that the polypropylene used as the raw material was melt-kneaded as it was, in place of the modified polypropylene powder, to obtain pellets.

EXAMPLE 4

Example 1 was repeated except that the polypropylene used for the reaction was replaced by a propylene-ethylene random copolymer having an ethylene content of 3.6% by weight and an intrinsic viscosity [η] of 2.16 dl/g, and the quantity of the cross-linking auxiliary added was made 0.3 mol and further, the quantity of electron rays absorbed was made 5 kGy, to obtain melt-kneaded pellets.

Comparative Example 4

The propylene-ethylene random copolymer used as the raw material in Example 4, was melt-kneaded as it was, in place of the modified polypropylene powder, to obtain pellets.

The conditions and results of the above Examples 1 to 4 and Comparative examples 1 to 4 are shown in Table 1.

Examples 5 to 8 and Comparative example 5

Modified polypropylene pellets were obtained in the same manner as in Example 1, except that continuous gas phase polymerization of propylene was carried out using a catalyst obtained by combining a magnesium chloride-supported type Ti catalyst component obtained according to the process described in Example 1 of the specification of Japanese patent application laid-open No. Sho 62-104812 and triethylaluminum (200 mols/one mol of Ti contained in the above Ti catalyst component), and diisopropyldimethoxysilane as a third component (20 mols/one mol of Ti contained in the above Ti catalyst component), in a continuous gas phase polymerization vessel, and in the presence of hydrogen, to obtain powder of a propylene homopolymer (20 Kg) having an intrinsic viscosity [η] of 1.97 dl/g and an average particle diameter of 750 μm, and other conditions shown in Table 2 were employed.

Comparative Example 6

Example 5 was repeated except that the polypropylene used as the raw material was used as it was, in place of the modified polypropylene powder, and the polypropylene was melt-kneaded to obtain pellets.

The conditions and results of the above Examples 5 to 8 and Comparative examples 5 and 6 are shown in Table 2.

EXAMPLE 9

The modified polypropylene powder (100 parts by weight) obtained in the same manner as in Example 1, according to the process of the present invention, tetraxis [methylene-3-(3',5'-di-t-butyl-4'-hydroxyphenyl)-propionate]methane (0.1 part by weight), calcium stearate (0.1 part by weight) and talc as a foam-nucleating agent (0.1 part by weight) were mixed, followed by feeding the mixture into a monoaxial extruder having a screw diameter of 65 mm and having the extruder temperature set to 230° C., and feeding 1,1,2,2-tetrafluorodichloroethane (22 parts by weight) as a foaming agent under pressure midway in the extruder, and further carrying out an extrusion-foaming molding by means of a nozzle-form mold of 5 mm in diameter fitted to the extruder, at a mold temperature of 155° C. The resulting expanded material had a smooth surface and uniform foams, without any abnormal foam.

Comparative Example 7

Example 9 was repeated except that the modified polypropylene obtained in Comparative example 2 was used in place of the modified polypropylene obtained according to the process of the present invention, followed by extrusion-foaming molding. The thus obtained expanded material had an inferior appearance due to occurrence of venting and had large voids; hence it was unsatisfactory for use.

EXAMPLE 10

The modified polypropylene pellets obtained in the same manner as in Example 5 was subjected to extrusion-sheeting at 260° C. by means of an extruder provided with T-die and having a screw diameter of 65 mm to obtain a sheet of 0.5 mm thick.

Next, in order to evaluate the heat-vacuum moldability of the sheet in a model manner, the sheet was fixed onto a frame of 40 cm square, and place d in a constant temperature bath at 210° C., to observe its heat behavior. When the sheet was heated, it began to sag at its central part, and when it sagged by 38 mm, the sagging stopped and contrarily the sagged part rose. When 10 seconds lapsed after stop of the sagging, the sheet began to sag again and thereafter sagging continued. The sag quantity was small and the period till start of resagging was as long as 10 seconds; thus it was found that the sheet had a far superior heat-vacuum moldability.

Comparative Example 8

Example 10 was repeated except that the polypropylene pellets obtained in the same manner as in Comparative example 5 were used in place of the modified polypropylene obtained according to the process of the present invention, to obtain a sheet. Its heat behavior was observed in the same manner as in Example 10. The sag of the sheet stopped at 40 mm and the period till start of resagging was as short as 3 seconds; hence the heat-vacuum moldability was inferior to that in the above Example 10.

EXAMPLE 11

In order to recycle-use the molded product of the present invention, a number of test pieces for measuring the bending modulus were prepared in the same manner as in Example 1, followed by grinding the injection molded test pieces by means of a grinder. A polypropylene composition consisting of the ground material of the test pieces (10% by weight) and polypropylene pellets obtained in the same manner as in Example 1 (90% by weight) was subjected to blow molding by means of a direct-blow molding machine having a screw diameter of 65 mm, at a molding temperature of 230° C. and at a mold temperature of 20° C., to obtain a kerosine tank of 100 l capacity. As a result, a homogeneous blow molded product without draw-down of parrison and having no thickness unevenness, was obtained.

TABLE 1

| Nos. of Examples and Comparative examples | Example 1 | Example 2 | Example 3 | Compar. ex. 1 | Compar. ex. 2 | Compar. ex. 3 | Example 4 | Compar. ex. 4 |
|---|---|---|---|---|---|---|---|---|
| Modification conditions | | | | | | | | |
| Kind of cross-linking auxiliary | Note 1 HDDA | HDDA | HDDA | HDDA | — | — | HDDA | — |
| Amount of cross-linking auxiliary (mmol/100 g polymer) | 0.5 | 1.5 | 3.0 | 15.0 | 0 | 0 | 1.5 | 0 |
| Absorbed amount of electron rays (kGy) | 3.0 | 5.0 | 1.0 | 5.0 | 3.0 | 0 | 5.0 | 0 |
| Heat-treatment temperature (°C.) | 135 | 140 | 120 | 135 | 135 | — | 135 | — |
| Heat-treatment period (min.) | 30 | 20 | 60 | 30 | 30 | — | 30 | — |
| Intrinsic viscosity of polypropylene prior to modification [η] (dl/g) | 2.20 | 1.67 | 1.80 | 2.20 | 2.20 | 2.20 | 2.16 | 2.16 |
| Modified polypropylene | | | | | | | | |
| Intrinsic viscosity [η] (dl/g) | 2.07 | 1.83 | 2.17 | Note 2 * | 1.97 | 2.20 | 2.07 | 2.16 |
| Weight average molecular weight (Mw) × $10^{-4}$ | 40.1 | 34.5 | 42.2 | * | 38.2 | 42.9 | 40.0 | 42.0 |
| Degree of branching (g) | 1.00 | 1.01 | 1.00 | * | 0.99 | 1.00 | 1.00 | 1.00 |
| Melt tension (MS) (gf) | 9.9 | 5.5 | 7.3 | 5.9 | 1.4 | 1.7 | 6.1 | 1.5 |
| Percentage of extraction residue with xylene (%) | 0.0 | 0.0 | 0.0 | 24.5 | 0.0 | 0.0 | 0.0 | 0.0 |
| Bending modulus (kgf/cm$^2$) | 17100 | 18000 | 16000 | * | 14000 | 13500 | 11800 | 10000 |

Note 1 HDDA: 1,6-hexanediol diacrylate
Note 2 *: not measured

TABLE 2

| Nos. of Examples and Comparative examples | Example 5 | Example 6 | Example 7 | Example 8 | Compar. ex. 5 | Compar. ex. 6 |
|---|---|---|---|---|---|---|
| Modification conditions | | | | | | |
| Kind of cross-linking auxiliary | Note 3 NDDA | Note 4 DEDA | Note 5 EGDM | Note 6 DVB | Note 7 TMTA | — |
| Amount of cross-linking auxiliary (mmol/100 g polymer) | 3.0 | 2.0 | 2.0 | 3.0 | 2.0 | 0 |
| Absorbed amount of electron rays (kGy) | 5.0 | 2.0 | 5.0 | 0.8 | 25.0 | 0 |
| Heat-treatment temperature (°C.) | 135 | 135 | 135 | 135 | 135 | — |
| Heat-treatment period (min.) | 30 | 30 | 30 | 30 | 30 | — |
| Intrinsic viscosity of polypropylene prior to modification [η] (dl/g) | 1.97 | 1.97 | 1.97 | 1.97 | 1.97 | 1.97 |
| Modified polypropylene | | | | | | |
| Intrinsic viscosity [η] (dl/g) | 1.92 | 1.97 | 1.63 | 2.02 | Note 2 * | 1.97 |
| Weight average molecular weight (Mw) × $10^{-4}$ | 36.8 | 37.5 | 30.6 | 38.8 | * | 37.8 |
| Degree of branching (g) | 1.00 | 1.01 | 1.00 | 1.00 | * | 1.00 |
| Melt tension (MS) (gf) | 6.7 | 5.5 | 2.1 | 5.3 | 1.3 | 1.1 |
| Percentage of extraction residue with xylene (%) | 0.0 | 0.0 | 0.0 | 0.0 | 12.0 | 0.0 |
| Bending modulus (kgf/cm$^2$) | 17500 | 16500 | 16800 | 16100 | * | 13500 |

Note 2 *: not measured
Note 3 NDDA: 1,9-nonanediol diacrylate
Note 4 DEDA: diethylene glycol diacrylate
Note 5 EGDM: ethylene glycol dimethacrylate
NOte 6 DVB: divinylbenzene
Note 7 TMTA: trimethylolpropane triacrylate Effectiveness of the Invention As evident from the above Examples, the modified polypropylene obtained according to the process of the present invention has a very high melt-tension and superior stiffness and moldability and can broaden use application field which has been restricted in the case of conventional polypropylene.

What we claim is:

1. A process for producing a modified polypropylene having (A) a degree of branching of substantially 1, (B) a relationship between its melt tension (MS) at 230° C. and its intrinsic viscosity (η) measured in tetralin at 135° C. expressed by an inequality log (*MS*)>4.24×log [η]−0.915, and (C) a percentage of extraction residue in boiling xylene of 1% by weight or less, which process comprises adding 0.05 to 10 millimols of a cross-linking auxiliary to 100 g of a linear polypropylene, mixing them, irradiating ionizing radiations to the mixture so as to give an absorbed dosage of 1 to 20 kGy, and subsequently heat-treating the resulting material at 80° to 350° C.

2. A process according to claim 1, wherein electron rays are used as the ionizing radiations.

3. A process according to claim 1, wherein the irradiation of the ionizing radiations and the heat-treatment are carried out in an atmosphere of an inert gas.

4. A molded product obtained by adding 0.05 to 10 millimols of a cross-linking auxiliary to 100 g of a linear polypropylene, mixing them, irradiating ionizing radiations to the mixture so as to give an absorbed dosage of 1 to 20 kGy, and subsequently heat-treating the resulting material at 80° to 350° C., which molded product has (A) a degree of branching of substantially 1, (B) a relationship between its melt tension (MS) at 230° C. and its intrinsic viscosity (η) measured in tetralin at 135° C. expressed by the following inequality:

log (*MS*)>4.24 log [η]−0.915, and (C) a percentage of extraction residue in boiling xylene of 1% by weight or less.

* * * * *